United States Patent
Tanabe

(10) Patent No.: US 7,808,740 B2
(45) Date of Patent: Oct. 5, 2010

(54) MAGNETIC DISK DRIVE AND CONTROL METHOD THEREOF

(75) Inventor: Hiroyasu Tanabe, Kanagawa (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 12/290,970

(22) Filed: Nov. 4, 2008

(65) Prior Publication Data

US 2009/0141400 A1    Jun. 4, 2009

(30) Foreign Application Priority Data

Dec. 3, 2007    (JP) .............................. 2007-312752

(51) Int. Cl.
*G11B 5/60*    (2006.01)
(52) U.S. Cl. ....................................................... 360/75
(58) Field of Classification Search ........................ None
See application file for complete search history.

(56) References Cited

U.S. PATENT DOCUMENTS

| | | | |
|---|---|---|---|
| 6,560,064 B1 * | 5/2003 | Hirano | 360/69 |
| 6,646,821 B2 * | 11/2003 | Bernett et al. | 360/75 |
| 6,680,806 B2 * | 1/2004 | Smith | 360/75 |
| 6,710,952 B1 * | 3/2004 | Smith | 360/75 |
| 6,785,089 B2 * | 8/2004 | Bernett et al. | 360/69 |
| 7,062,387 B1 * | 6/2006 | Burns et al. | 702/51 |
| 7,212,370 B1 * | 5/2007 | Fukushima | 360/75 |
| 7,236,321 B1 * | 6/2007 | Fukushima | 360/75 |
| 7,268,966 B2 * | 9/2007 | Pit et al. | 360/75 |
| 2003/0172520 A1 * | 9/2003 | Liu et al. | 29/603.03 |
| 2006/0126224 A1 | 6/2006 | Sakamoto et al. | |
| 2008/0080086 A1 * | 4/2008 | Che et al. | 360/75 |

FOREIGN PATENT DOCUMENTS

| | | |
|---|---|---|
| JP | 61-099834 | 5/1986 |
| JP | 09-063220 | 3/1997 |

* cited by examiner

*Primary Examiner*—Hoa T Nguyen
*Assistant Examiner*—James L Habermehl

(57) ABSTRACT

Embodiments of the present invention provide a magnetic disk drive capable of suppressing variations in flying height of a magnetic head caused by decrease in the amount of a low density gas inside a housing and a control method therefore. According to one embodiment, the magnetic disk drive includes a magnetic head, a magnetic disk, and a housing containing the magnetic head and the magnetic disk, wherein the housing is filled with a low density gas having a lower density than air. An amount of the low density gas in the housing is estimated and, based on the amount of the low density gas, a flying height of the magnetic head from a surface of the magnetic disk is controlled.

17 Claims, 9 Drawing Sheets

Fig.2
(a)
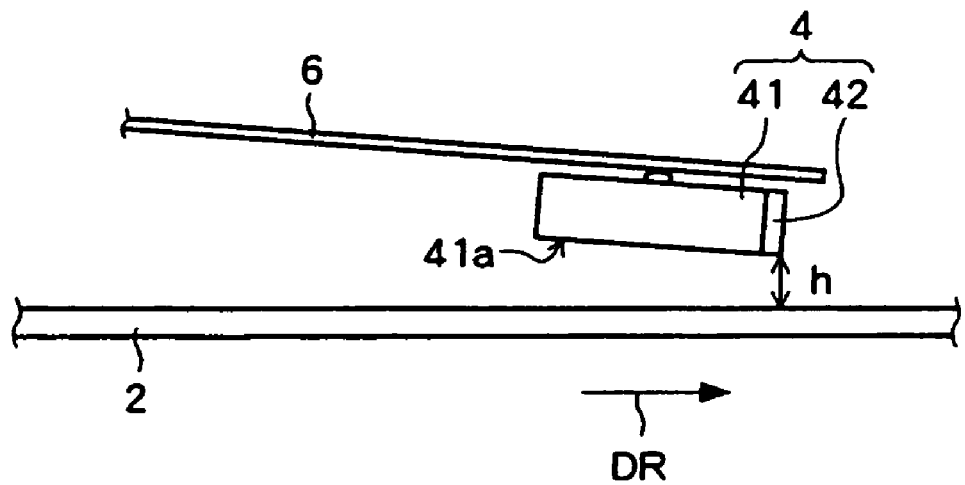
(b)
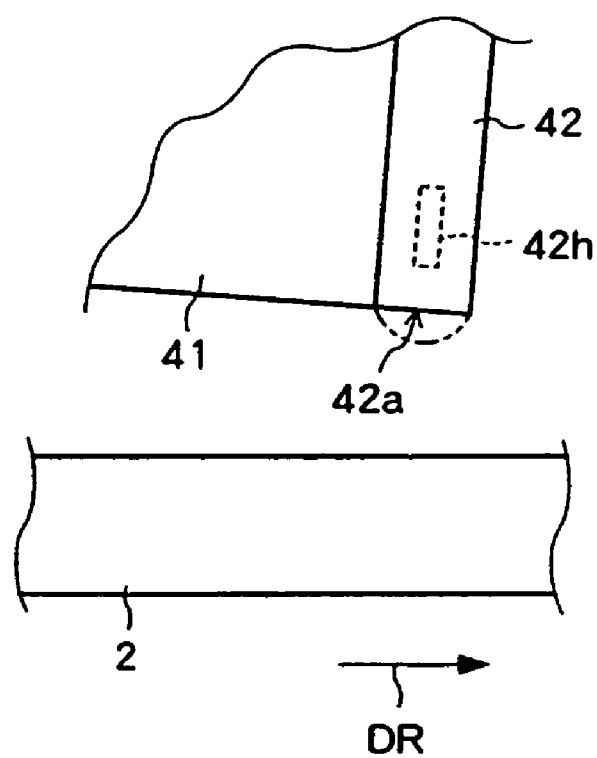

(a)

| He amount | TFC power application amount |
|---|---|
| 100 | 43 |
| 95 | 38 |
| 90 | 40 |

Fig.5
(a)
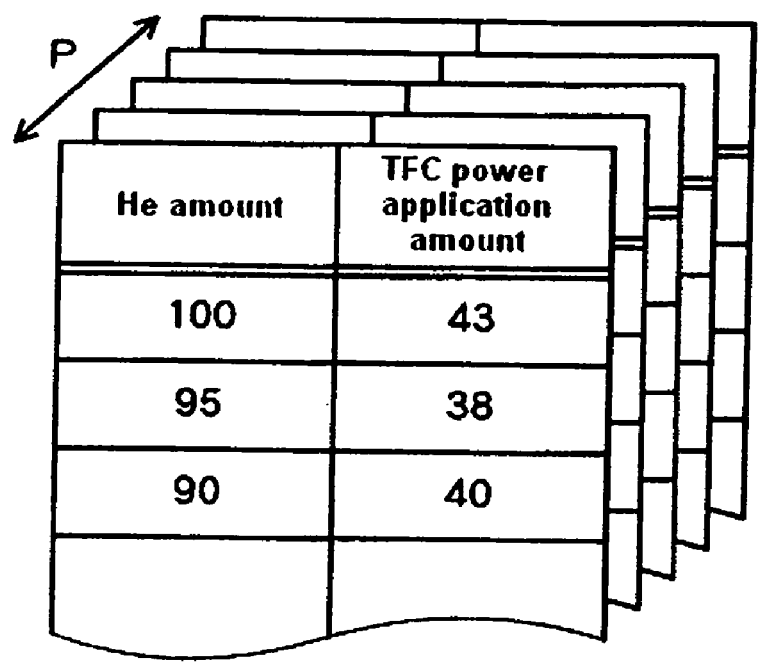
(b)
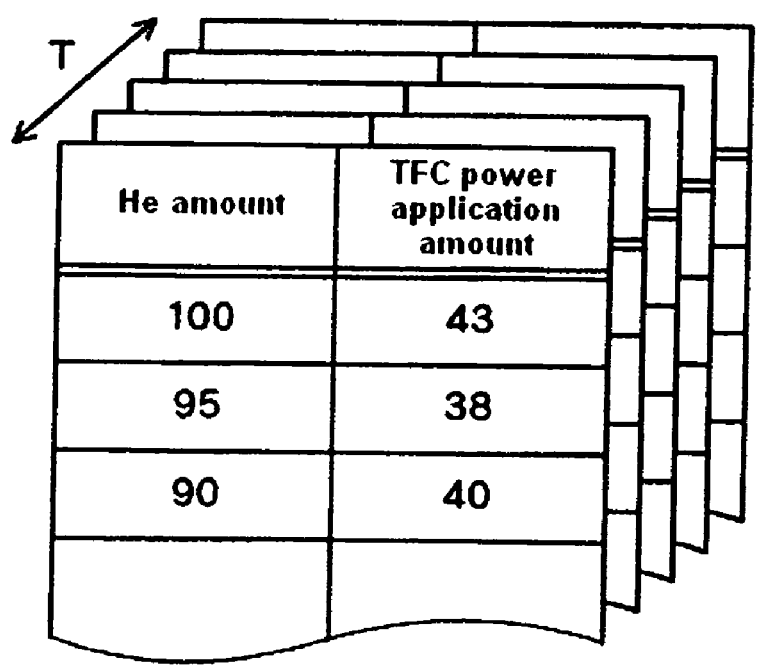

Fig.8
(a)
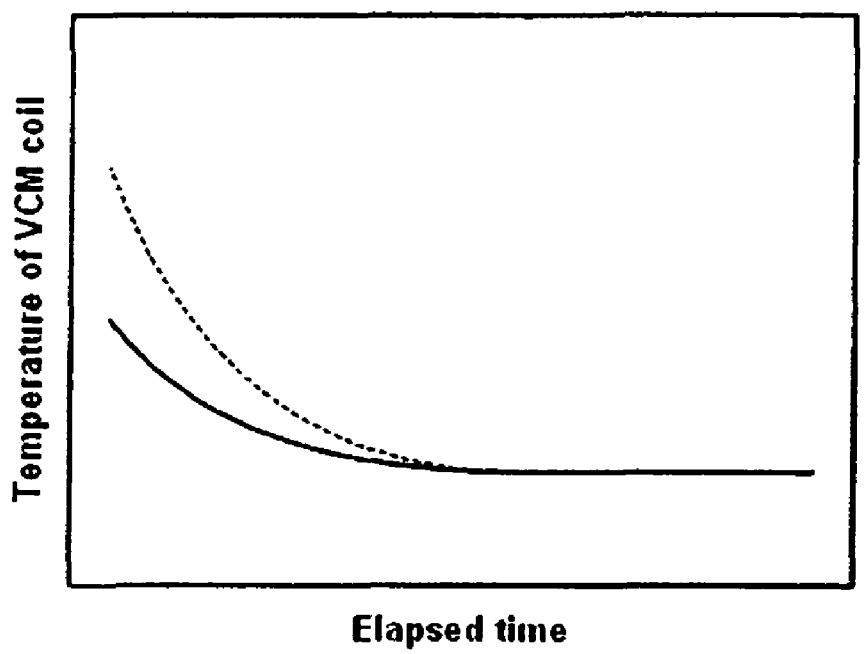
(b)
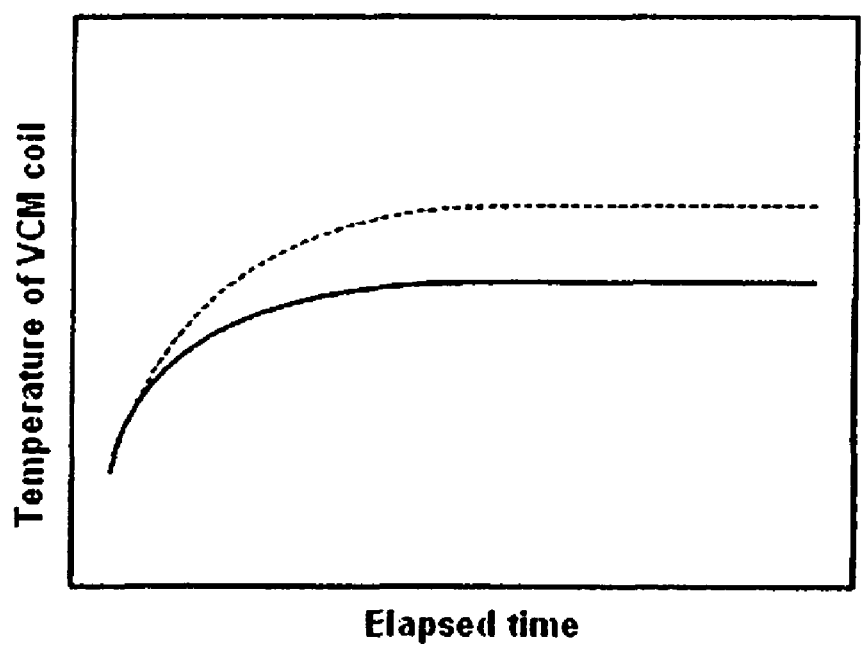

MAGNETIC DISK DRIVE AND CONTROL METHOD THEREOF

CROSS-REFERENCE TO RELATED APPLICATION

The instant nonprovisional patent application claims priority to Japanese Patent Application No. 2007-312752 filed Dec. 3, 2007 and which is incorporated by reference in its entirety herein for all purposes.

BACKGROUND OF THE INVENTION

In the field of magnetic disk drives such as hard disk drives, there is proposed a magnetic disk drive including a magnetic head, a magnetic disk, and a housing containing the magnetic head and the magnetic disk, wherein the housing is filled with a low density gas such as He (helium) having a lower density than air. When the housing is filled with the low density gas, vibrations of the magnetic head and the magnetic disk can be reduced and, thereby, the performance of writing and reading data can be improved.

However, such a magnetic disk drive has a problem in which the low density gas begins to leak from the housing with time, and cannot be utilized. Accordingly, Japanese Patent Publication No. 2004-535647 ("Patent Document 1") discloses a technology with which a warning is given when the density of helium in the housing reaches an unacceptable level.

The aforementioned Patent Document 1 only refers to the increase of the flying height of the magnetic head when the amount of the low density gas in the housing decreases, and it has not mentioned the possibility of decrease in the flying height of the magnetic head at all.

BRIEF SUMMARY OF THE INVENTION

Embodiments of the present invention provide a magnetic disk drive capable of suppressing variations in flying height of a magnetic head caused by decrease in the amount of a low density gas inside a housing, and a control method therefore. According to the embodiment of FIG. 3, a magnetic disk drive includes a magnetic head, a magnetic disk, and a housing containing the magnetic head and the magnetic disk, wherein the housing is filled with a low density gas having a lower density than air. An amount of the low density gas in the housing is estimated (S2) and, based on the amount of the low density gas, a flying height of the magnetic head from a surface of the magnetic disk is controlled (S4 to S7).

BRIEF DESCRIPTION OF THE DRAWINGS

FIGS. 2(a) and 2(b) show exemplary floating states of a magnetic head.

FIGS. 5(a) and 5(b) show examples of contents of a set table.

FIGS. 8(a) and 8(b) show examples of variation with the lapse of time of the temperature of a coil part.

DETAILED DESCRIPTION OF THE INVENTION

Embodiments of the present invention relate to a magnetic disk drive whose housing is filled with a low density gas having a lower density than air and a control method therefor.

Embodiments of the present invention are made in view of the above circumstances, and provide a magnetic disk drive capable of suppressing the variation of the flying height of the magnetic head caused by the decrease in the amount of the low density gas in the housing and a control method therefor.

When the low density gas begins to leak from the inside of the housing, air having higher viscosity than the low density gas may flow into the housing. Therefore, it has been thought that as the amount of the low density gas in the housing decreases, the flying height of the magnetic head increases uniformly.

However, as a result of intensive studies, it was found that, in reality, when the amount of the low density gas in the housing decreases, the flying height of the magnetic head may sometimes decrease.

It is conceivable that this is because when the amount of the low density gas in the housing decreases, the balance of positive pressure and negative pressure acting on a slider of the magnetic head is lost to cause a change of the floating posture of the slider.

Figure 9:
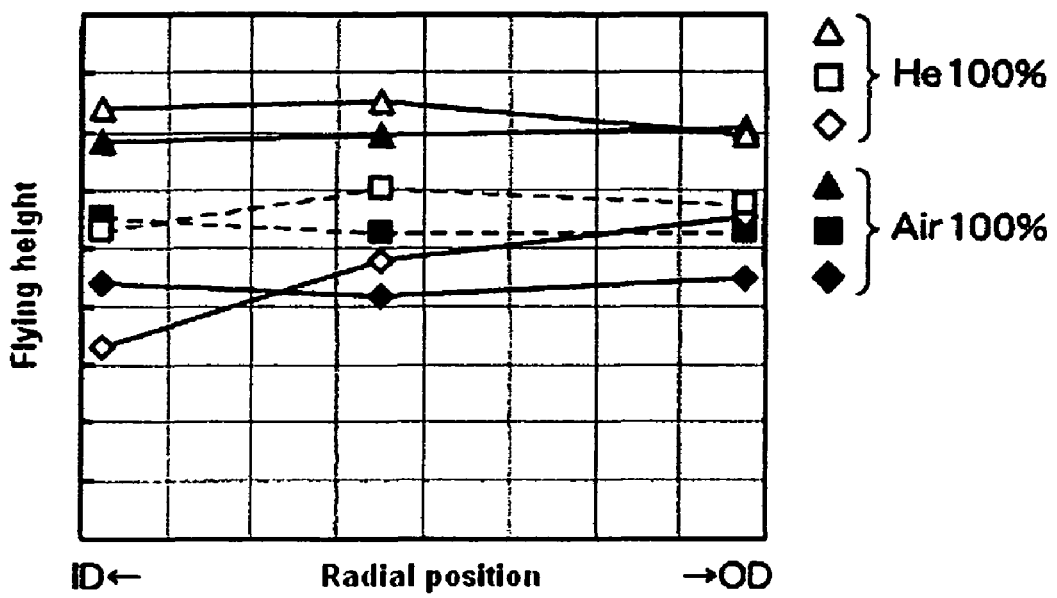
FIG. 9 is an exemplary graph showing the relationship between a flying height of a magnetic head and a radial position when a gas to be charged in a housing is replaced.

FIG. 9 shows the relationship between the flying height of the magnetic head and the radial position when the housing is filled with He or air. In this graph, a flying height when the housing is completely filled with He is shown by a white mark, and a flying height when the housing is completely filled with air is shown with a black mark. Moreover, marks in the same shape show that the rotational speed of the magnetic disk is the same. According to the graph, the flying height of the magnetic head in the case of being filled with He is lower than the flying height of the magnetic head in the case of being filled with air in some part of the range. This shows that the flying height of the magnetic head may decrease when the amount of the low density gas in the housing decreases.

Figure 10:
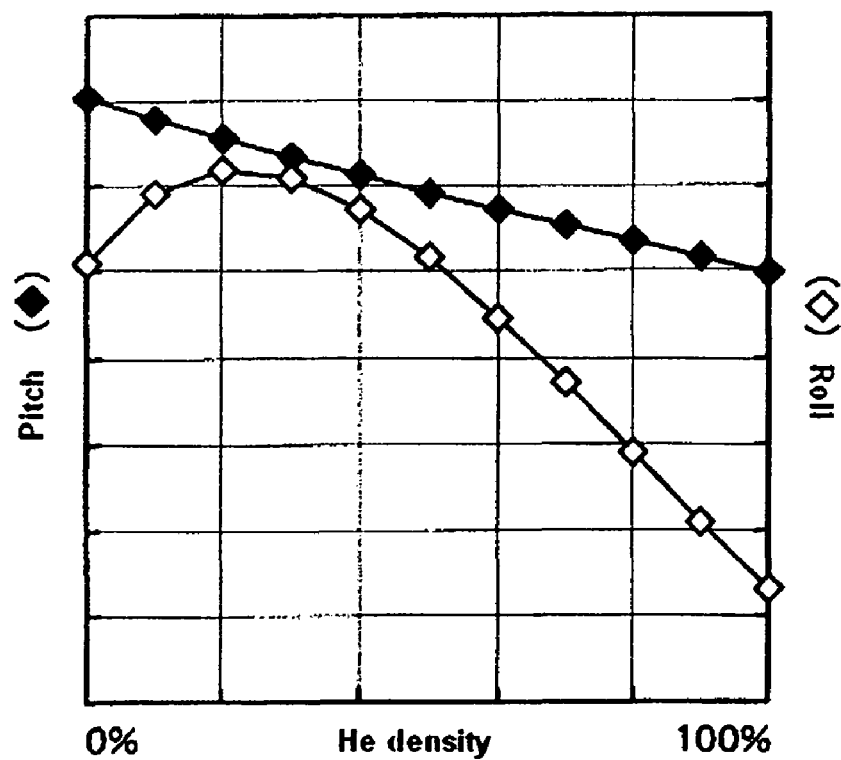
FIG. 10 is an exemplary graph showing the relationship between the He density in the housing and a floating posture of a slider.

Further, the relationship between the He density in the housing and the floating posture of the slider is shown in FIG. 10. In this regard, a pitch means a slant of the slider in a circumferential direction of the magnetic disk, and a roll means a slant of the slider in a radial direction of the magnetic disk. As seen in the graph, the roll and the pitch vary according to the density of He in the housing. This shows that the floating posture of the slider changes when the amount of the low density gas in the housing decreases.

Figure 11:
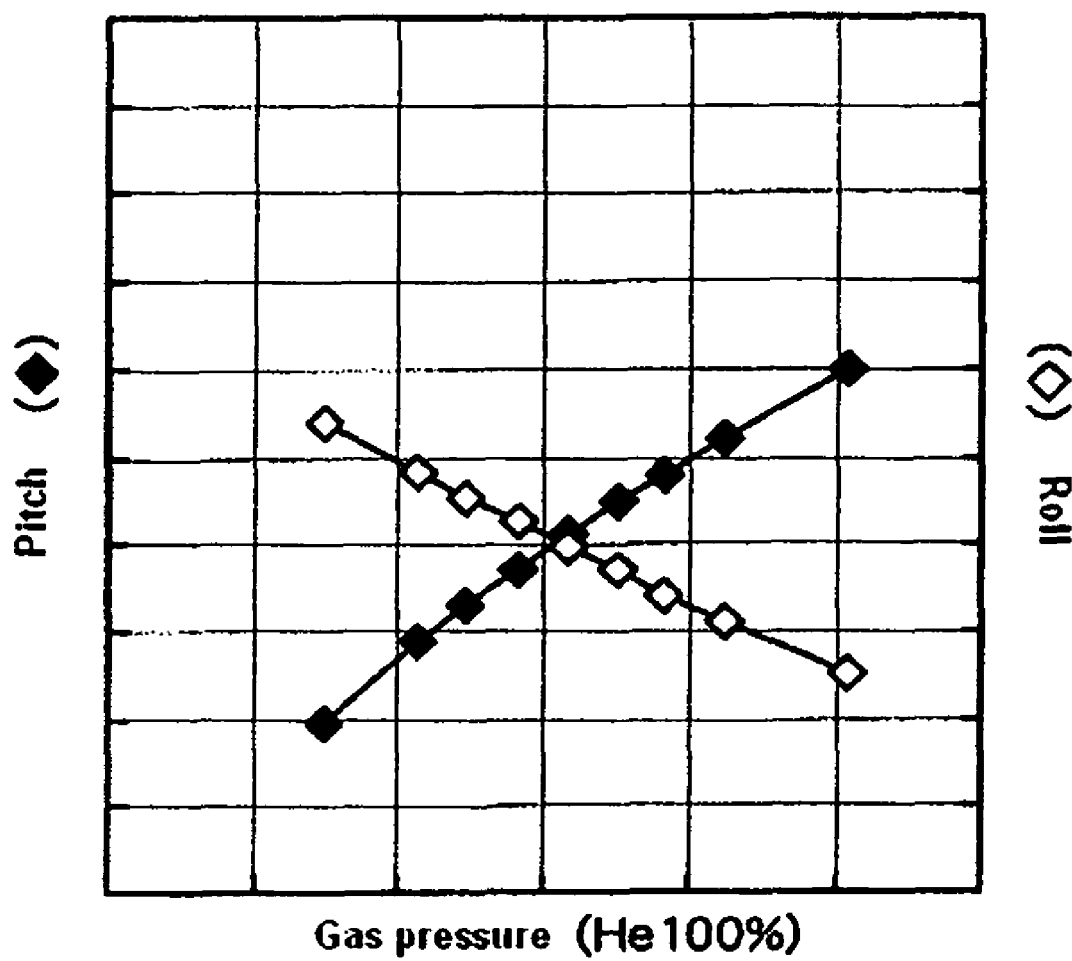
FIG. 11 is an exemplary graph showing the relationship between a gas pressure in the housing filled with He and the floating posture of the slider.

Further, the relationship between the pressure in the housing filled with He and the floating posture of the slider is shown in FIG. 11. When the low density gas begins to leak from the inside of the housing, air does not flow into the housing, or only a small amount of air flows into the housing, and the pressure in the housing may fall. Therefore, in FIG. 10, the effect of the pressure in the housing on the flying posture of the slider is examined. It is seen in the graph that the roll and the pitch vary according to the pressure inside the housing. This also shows that as the amount of the low density gas in the housing decreases, the flying posture of the slider varies.

As described above, when the amount of the low density gas in the housing decreases, the floating posture of the slider changes and the flying height of the magnetic head may decrease. This means that the magnetic head may come in contact with the magnetic disk. Therefore, it is necessary to adjust the flying height of the magnetic head so that the magnetic head may not come in contact with the magnetic disk.

In order to solve the above problems, a magnetic disk drive according to embodiments of the present invention includes a magnetic head, a magnetic disk, and a housing containing the magnetic head and the magnetic disk, wherein the housing is filled with a low density gas having a lower density than air. The magnetic disk drive comprises: an estimation part for estimating an amount of the low density gas in the housing; and a control part for controlling, based on the amount of the low density gas, a flying height of the magnetic head from a surface of the magnetic disk.

In one aspect of embodiments of the present invention, the magnetic disk drive further comprises a heat generating body provided in the housing, and the estimation part estimates a density of the low density gas based on a temperature change rate of the heat generating body.

Also, the magnetic disk drive may further comprise, as the heat generating body, a voice coil motor which moves the magnetic head relative to the magnetic disk.

Further, the estimation part may measure temperatures of the heat generating body during heating or after heating with a plurality of timing to calculate the temperature change rate of the heat generating body.

Still further, the magnetic disk drive may also comprise a pressure sensor for detecting an internal pressure of the housing, and the estimation part may estimate an amount of the low density gas based on a density of the low density gas and the pressure in the housing.

In one aspect of embodiments of the present invention, the estimation part obtains a signal which varies according to a density of the low density gas in the housing and estimates the density of the low density gas based on the signal.

Also, the above signal may be a signal in which the magnitude of an NRRO component varies according to a density of the low density gas in the housing, and the estimation part may estimate the density of the low density gas based on the magnitude of the NRRO component.

Still further, the magnetic disk drive may also comprise a spindle motor for rotating the magnetic disk, the signal is a signal showing a magnitude of output to the spindle motor, and the estimation part may estimate the density of the low density gas based on the magnitude of the output to the spindle motor.

Still further, the magnetic disk drive may also comprise a pressure sensor for detecting an internal pressure of the housing, and the evaluation part may evaluate the amount of the low density gas based on the density of the low density gas and the pressure in the housing.

In one aspect of embodiments of the present invention, the magnetic disk drive further comprises a pressure sensor for detecting a pressure in the housing, and the estimation part estimates the amount of the low density gas based on the pressure in the housing.

Further, the estimation part may estimate a density of the low density gas in the housing and, based on the density of the low density gas and the pressure in the housing, estimate the amount of the low density gas.

In one aspect of embodiments of the present invention, with respect to the control part, a change in the control amount, caused by a decrease in the amount of the low density gas, for controlling a flying height of the magnetic head includes a portion which turns to be a change toward a side where the flying height of the magnetic head increases.

In one aspect of embodiments of the present invention, with respect to the control part, a change in the control amount, caused by a decrease in the amount of the low density gas, for controlling a flying height of the magnetic head includes both the portion of a positive change rate and a negative change rate.

In one aspect of embodiments of the present invention, the magnetic disk drive further comprises a pressure sensor for detecting an internal pressure of the housing, and the control part controls the flying height of the magnetic head based on the amount of the low density gas and the pressure in the housing.

In one aspect of embodiments of the present invention, the magnetic disk drive further comprises a temperature sensor for detecting an internal temperature of the housing, and the control part controls the flying height of the magnetic head based on the amount of the low density gas and the temperature in the housing.

In one aspect of embodiments of the present invention, the control part obtains positional information representing a radial position of the magnetic disk where the magnetic head is positioned and, based on the amount of the low density gas and the positional information, controls the flying height of the magnetic head.

In one aspect of embodiments of the present invention, the magnetic head comprises an electric heating body which generates heat when electric power is applied, and the control part controls the flying height of the magnetic head by controlling the amount of power applied to the electric heating body.

In one aspect of embodiments of the present invention, the low density gas is helium.

Further, a magnetic disk drive according to embodiments of the present invention includes a magnetic head, a magnetic disk, and a housing containing the magnetic head and the magnetic disk, wherein the housing is filled with a low density gas having a lower density than air. The magnetic disk drive comprises: a heat generating body provided in the housing; an estimation part for estimating an amount of the low density gas in the housing based on a temperature change rate of the heat generating body; and a control part for controlling a flying height of the magnetic head from a surface of the magnetic disk based on the amount of the low density gas.

Further, the control method of a magnetic disk drive of embodiments of the present invention is directed to a magnetic disk drive including a magnetic head, a magnetic disk, and a housing containing the magnetic head and the magnetic disk, wherein the housing is filled with a low density gas having a lower density than air, and comprises the steps of: estimating an amount of the low density gas in the housing; and controlling, based on the amount of the low density gas, a flying height of the magnetic head from a surface of the magnetic disk.

According to embodiments of the present invention, the flying height of the magnetic head is controlled based on the amount of the low density gas in the housing, so that the change in the flying height of the magnetic head caused by the reduction in the amount of the low density gas in the housing can be suppressed.

Now, with reference to drawings, embodiments of the present invention will be described.

Figure 1:
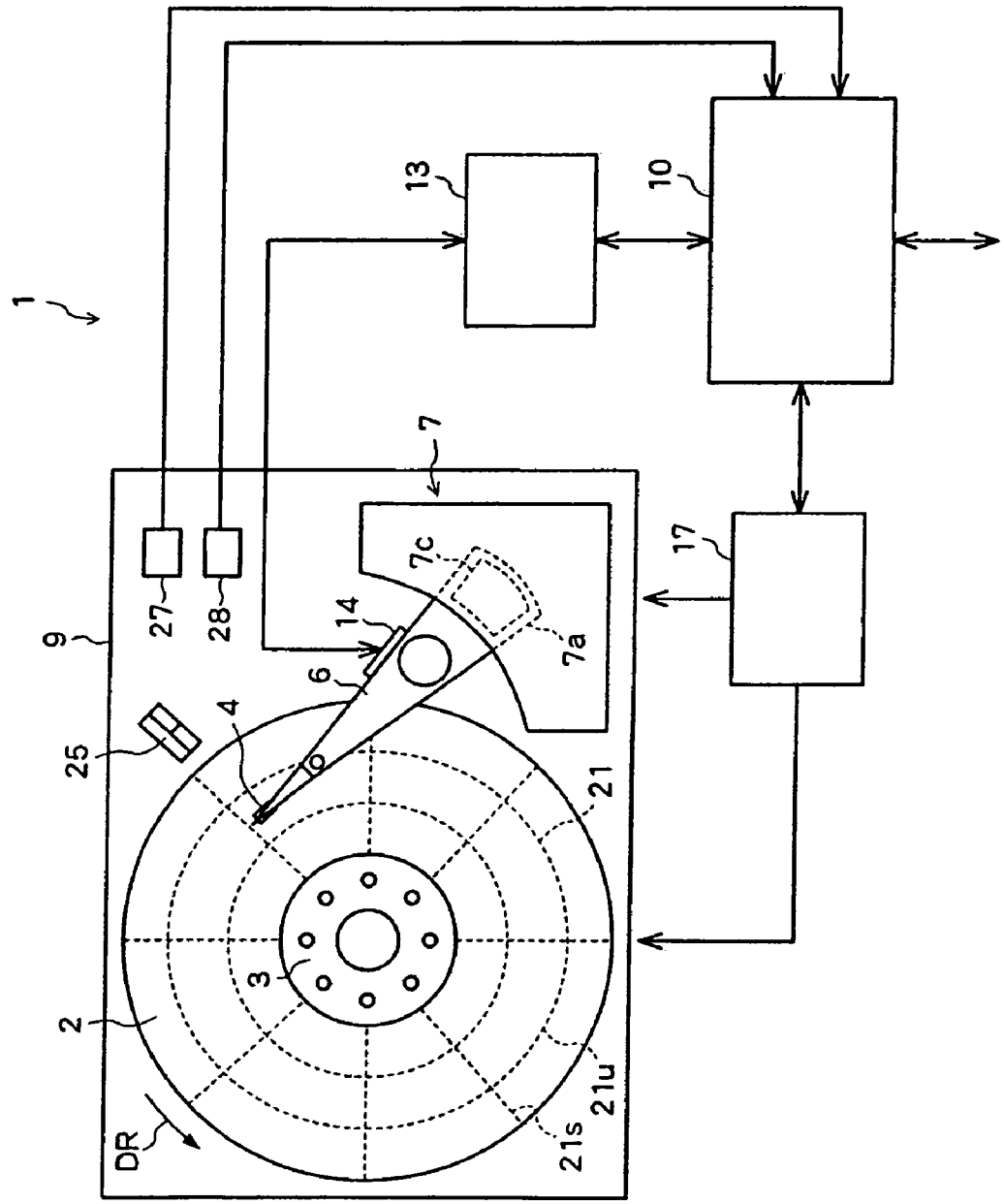
FIG. 1 is an exemplary block diagram showing a configuration of a magnetic disk drive according to an embodiment of the present invention.

FIG. 1 shows a configuration of a magnetic disk drive 1 according to an embodiment of the present invention. In an housing 9 of the magnetic disk drive 1, there are accommodated a magnetic disk 2, a spindle motor 3, a magnetic head 4, a head assembly 6, a voice coil motor 7, and a head amplifier 14.

The housing 9 is filled with He (helium) as a low density gas having a lower density than air. Further, the low density gas with which the housing 9 is filled may be hydrogen etc.

The magnetic disk 2 is rotated in the direction of an arrow DR in FIG. 1 by the spindle motor 3. On the magnetic disk 2, two or more concentric tracks 21 are formed. Along each track 21, there are formed servo date areas 21s arranged in a radial direction at a predetermined angle, and user data areas 21u disposed between two neighboring servo data areas 21s.

Each servo data area 21s contains servo data as positional information. The servo data includes address data and burst signals. The radial position of the magnetic disk 2 can be specified by tracks data included in address data. Further, user data is used in each user data area 21u.

Next to the magnetic disk 2, there is provided a head assembly 6 supported in the housing 9. The magnetic head 4 is supported on a top portion of the head assembly 6. Further, at the back end side of the head assembly 6, the voice coil motor 7 is provided. The voice coil motor 7 includes a coil part 7c formed at the back end of the head assembly 6 and a yoke part 7a sandwiching the coil part 7c.

When electric power is applied to the coil part 7c, the voice coil motor 7 generates driving power for rotating the head assembly 6, thereby moving the magnetic head 4 in a substantially radial direction on the magnetic disk 2. Further, beside the magnetic disk 2, there is provided a ramp part 25 onto which the magnetic head 4 retreats.

Though not shown, two or more magnetic disks 2 are fixed to the spindle motor 3. Moreover, corresponding to recording surfaces of two or more magnetic disks 2, two or more magnetic heads 4 are mounted to the head assembly 6.

Further, a pressure sensor 27 and a temperature sensor 28 are installed in the housing 9. The pressure sensor 27 detects an internal pressure of the housing 9 and outputs a signal representing the pressure. The temperature sensor 28 detects an internal temperature of the housing 9 and outputs a signal representing the temperature.

The magnetic disk drive 1 comprises a circuit board fixed to the outside of the housing 9. On the circuit board, there are formed a main control circuit 10, a read/write channel (R/W channel) 13, and a motor driver 17. In the present embodiment, the main control circuit 10 functions as the estimation part and the control part described above.

The main control circuit 10 includes a micro processing unit (MPU) and a memory, such as ROM and RAM. The main control circuit 10 reads programs stored in the memory and executes them to achieve various kinds of control operations such as position control of the magnetic head 4 or read and write control of data.

Furthermore, the main control circuit 10 includes a hard disk controller (HDC) and a buffer memory. The HDC has an interface controller, an error correction circuit, a buffer controller, etc.

In the position control of the magnetic head 4, the main control circuit 10 locates a current position of the magnetic head 4 based on servo data inputted from the R/W channel 3.

Further, the main control circuit 10 generates a control signal for positioning the magnetic head 4 on a target track and outputs it to the motor driver 17. The motor driver 17 converts the control signal to analog data, amplifies it, and outputs it to the voice coil motor 7.

Further, the main control circuit 10 outputs, to the motor driver 17, a command for rotating the spindle motor 3 at a predetermined rotational speed. According to the command from the main control circuit 10, the motor driver 17 outputs a drive current to the spindle motor 3. The motor driver 17 monitors the rotational speed of the spindle motor 3 and adjusts the drive current to achieve the rotational speed as specified.

In the read and write control of data, upon receipt of user data to be written onto the magnetic disk 2 from an external host drive, the main control circuit 10 outputs the user data to the R/W channel 13. Further, when the decoded user data is inputted from the R/W channel 13, the main control circuit 10 sends the user data to the external host drive. Also, the main control circuit 10 temporarily stores the user data in the buffer memory.

When the user data is inputted from the main control circuit 10, the R/W channel 13 encodes the user data and outputs it to the head amplifier 14. When the amplified read signal is inputted from the head amplifier 14, the R/W channel 13 converts the read signal to digital data, decodes it, and outputs it to the main control circuit 10. Further, the R/W channel 13 extracts servo data from the read signal at a predetermined sampling cycle and outputs them to the main control circuit 10.

When the encoded user data is inputted from the R/W channel 13, the head amplifier 14 converts the user data to a write signal and outputs it to the magnetic head 4. Further, when the read signal obtained from the magnetic disk 2 is inputted from the magnetic head 4, the head amplifier 14 amplifies the read signal and outputs it to the R/W channel 13.

When the write signal is inputted from the head amplifier 14, the magnetic head 4 applies a write magnetic field corresponding to the write signal to the magnetic disk 2. Thus, magnetization representing the user data is written onto the magnetic disk 2. Further, the magnetic head 4 reads out, as a read signal, the magnetic field leaking from the magnetization recorded on the magnetic disk 2 and outputs the read signal to the head amplifier 14.

FIGS. 2(a) and 2(b) show floating states of the magnetic head 4. As shown in FIG. 2(a), the magnetic head 4 includes a slider 41 and an element 42 part. The slider 41 is supported on a top portion of the head assembly 6. There is formed, on its undersurface (surface to face the magnetic disk 2) 41a, an ABS (Air Bearing Surface) for generating a floating force making use of the viscosity of a gas. Further, at the rear end portion (the side of the rotational direction DR of the magnetic disk 2) of the slider 41, there is formed an element part 42 including a write element and a read element.

The slider 41 floats over the rotating magnetic disk 2 with a certain gap therebetween with the side of the element part 42 slightly leaning downward. In this regard, a height h from the surface of the magnetic disk 2 to the lower end of the element part 42 is regarded as a flying height of the magnetic head 4.

Further, as shown in FIG. 2(b), the element part 42 includes a heater (electric heating body) 42h which generates heat when electric power is applied. When the heater 42h generates heat, the element part 42 is thermally expanded and its undersurface 42a protrudes toward the side of the magnetic disk 2 (so-called "TPTP (Thermal Pole Tip Protrusion)"). Accordingly, the flying height of the magnetic head 4 can be lowered.

The head amplifier 14 includes a circuit for applying electric power to the heater 48h. The main control circuit 10 controls the flying height of the magnetic head by controlling the amount of electric power applied to the heater 48h through the head amplifier 14. Thus, the so-called "TFC (Thermal Flyheight Control)" is realized.

The control method is not limited to this. For example, a micro-actuator comprising a piezoelectric element etc. may be provided on a supporting system of the magnetic head 4 to control the flying height of the magnetic head 4.

Figure 3:
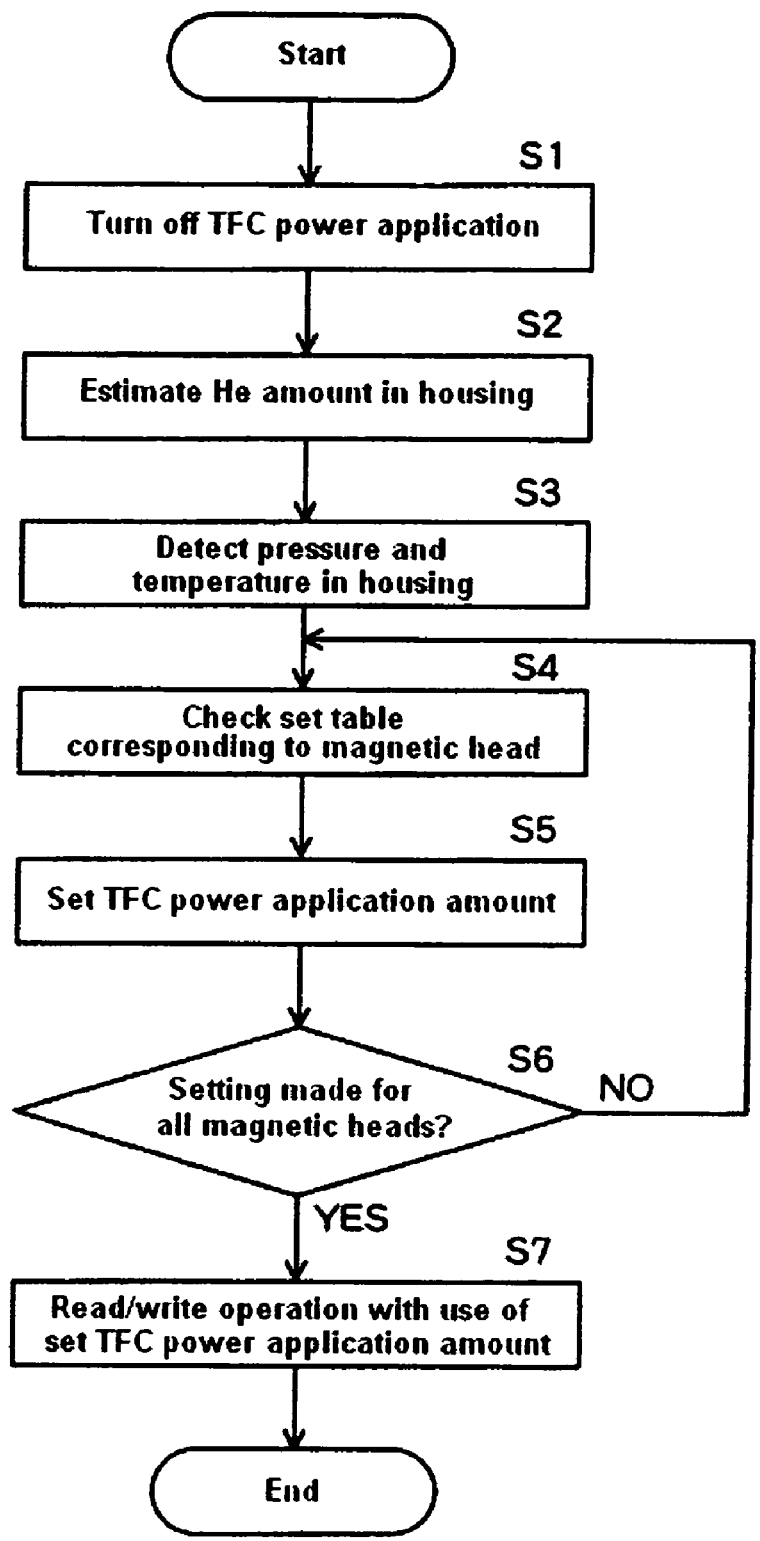
FIG. 3 is an exemplary flowchart showing a working example of the magnetic disk drive according to an embodiment of the present invention.

FIG. 3 is a flowchart showing a working example of the magnetic disk drive 1. This operation is an adjustment operation of the flying height of the magnetic head 4 and is carried out, for example, when starting the magnetic disk drive 1.

In S1, the main control circuit 10 turns off the power application (hereinafter, referred to as "TFC power application") to the heater 42h included in the element part 42 of the magnetic head 4. Thus, a gap between the magnetic head 4 and the magnetic disk 2 is secured. Further, in S1, the main control circuit 10 may drive the voice coil motor 7 to have the magnetic head 4 retreat onto the ramp part 25.

In S2, the main control circuit 10 estimates a He amount in the housing 9 (a function as an estimation part). A specific method to estimate the He amount in the housing 9 will be described in detail later.

The He amount in the housing 9 can be estimated, for example, by a He density in the housing 9. This method may be desirable for He leaking from the housing 9 where air flows in when the He leaks, and the He in the housing 9 is replaced with the air.

Further, the He amount in the housing 9 may be estimated, for example, by a gas pressure inside the housing 9. This method may be desirable for He leaking from the housing 9 where air does not flow in, even when the He leaks out and the He leaks from the housing 9 one-sidedly.

Further, the He amount in the housing 9 may be estimated, for example, by both the He density and the pressure in the housing 9. This method may be desirable in an aspect of He leaking from the housing 9 where both the above two aspects exist, that is, in an aspect of only a little amount of air, relative to the leaked He, flows into the housing 9.

In S3, the main control circuit 10 detects the pressure and temperature in the housing 9 through the pressure sensor 27 and the temperature sensor 28 provided in the housing 9.

In S4, the main control circuit 10 checks a set table, and reads a TFC power application amount corresponding to the estimated He amount in the housing 9 and the detected pressure and temperature in the housing 9. The TFC power application amount is a control amount for controlling the flying height of the magnetic head 4. Also, the set table is stored, for example, in a memory of the main control circuit 10 or on the magnetic disk 2.

In S5, the main control circuit 10 sets the read TFC power application amount in the memory for controlling the TFC power application.

Moreover, the main control circuit 10 carries out steps S4 and S5 with respect to all the magnetic heads 4 (S6). In this regard, two or more magnetic heads 4 are not uniform in floating characteristics. Therefore, two or more set tables corresponding to floating characteristics of the magnetic heads 4 may be prepared.

In S7, by performing TFC power application by using the set TFC power application amount, the main control circuit 10 keeps the flying height of the magnetic head 4 at a predetermined level, and performs a read and write operation in this state. Also, the above steps S4 to S7 are based on the function of the main control circuit 10 as a control part.

Figure 4:
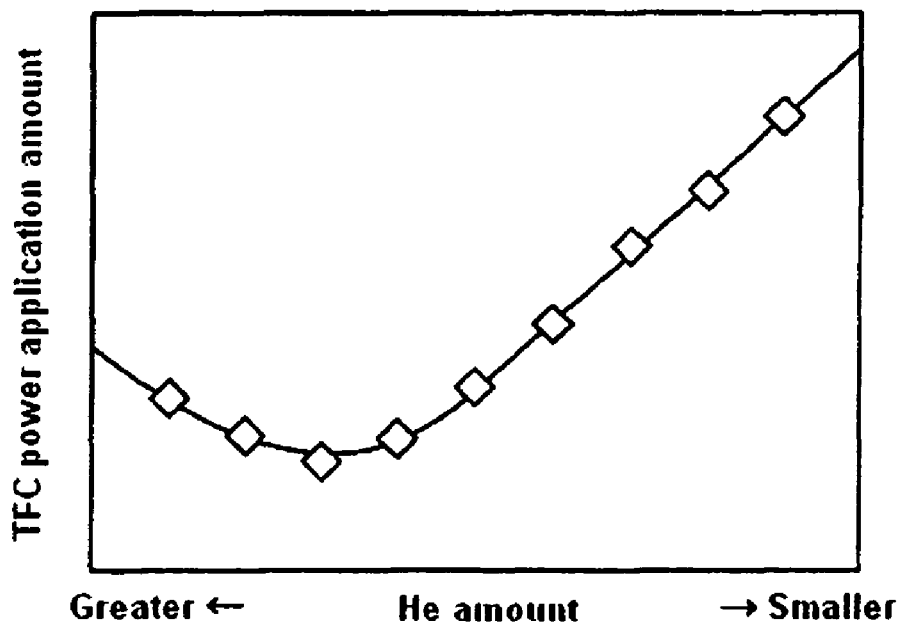
FIG. 4(a) shows an example of contents of a set table.
FIG. 4(b) shows a graph showing an example of the relationship between the He amounts and TFC power application amounts described in the set table.

FIG. 4(a) shows an example of contents of the set table. The set table contains He amounts at two or more spots and TFC power application amounts corresponding to respective He amounts. Further, FIG. 4(b) is a graph showing an example of the relationship between the He amounts and TFC power application amounts described in the set table. In S4, the main control circuit 10 checks the set table and reads the TFC power application amount corresponding to the estimated He amount.

Such a set table can be prepared, for example, by measuring, in advance, a flying height of the magnetic head 4 corresponding to each He amount. The flying height of the magnetic head 4 corresponding to each He amount is measured in a following manner. That is, first, the housing 9 is filled with a predetermined He amount. Subsequently, the amount of He to be charged in a process of measuring the flying height of the magnetic head 4 in such an environment is changed several times, and then the process is repeated each time to measure the flying height of the magnetic head 4 corresponding to each He amount. Then, from the flying height of the magnetic head 4 corresponding to each He amount thus measured, a TFC power application amount corresponding to each He amount is calculated.

For example, when the measured flying height of the magnetic head 4 is greater than a flying height to be referenced (reference flying height), the TFC power application amount is made to be a comparatively large value corresponding to a difference between the measured height and the reference height. In this way, a protrusion amount of the element part 42 of the magnetic head 4 is increased, thereby decreasing the flying height of the magnetic head 4 to allow the measured flying height to be close to the reference flying height. On the other hand, when the measured flying height of the magnetic head 4 is smaller than the reference flying height, a TFC power application amount is made to be comparatively small corresponding to the difference to reduce the protruding amount of the element part 42 of the magnetic head 4. Thus, the flying height of the magnetic head 4 is increased to allow the measured flying height to be closer to the reference flying height. As described above, even when the He amount in the housing 9 varies, the flying height of the magnetic head 4 can be kept at a predetermined level by calculating a TFC power application amount and preparing the set table.

Further, as described above, when He leaks from the housing 9, the flying height of the magnetic head 4 does not necessarily increase. That is, the flying height of the magnetic head 4 may increase or decrease. Therefore, the relationship between the He amount described in the set table and the TFC power application amount is as shown in FIG. 4(b). That is, a change in TFC power application amount accompanying a decrease in the He amount in the housing 9 exhibits a negative change rate in some part of the range and a positive change rate in other part of the range. In this regard, the portion exhibiting the positive change rate is a portion to be a change toward a side where the TFC power application amount increases, that is, a change to a side where the flying height of the magnetic head 4 decreases. On the other hand, the portion exhibiting the negative change rate is a portion to be a change toward a side where the TFC power application amount decreases, that is, a change to a side where the flying height of the magnetic head 4 increases.

That is, it is difficult to predict whether the flying height of the magnetic head 4 increases or decreases in accordance with the leak of He from the housing 9. Therefore, according to the present embodiment, the flying height of the magnetic head 4 at each He amount is measured in advance. Based on these measurement results, TFC power application amounts for keeping the flying height of the magnetic head 4 at a predetermined level are calculated, respectively, to be described in the set table.

When He begins to leak from the inside of the housing 9, the internal pressure or temperature of the housing 9 may vary, and the flying height of the magnetic head 4 may vary according to such an environmental change. For this reason, as shown in FIGS. 5(*a*) and 5(*b*), both the two or more set tables may be prepared corresponding to respective pressures (P) and two or more set tables corresponding to respective temperatures (T). In addition, there is a linear relationship between the pressure (P) and the temperature (T) in the housing 9. Therefore, two or more set tables corresponding to values of the ratios (P/T) may be prepared.

These set tables can be prepared by measuring the relation between the He amount in the housing 9 and the flying height of the magnetic head 4 by use of each pressure (P) or each temperature (T) in advance. In S4, the main control circuit 10 selects a set table corresponding to the pressure and the temperature in the housing 9 detected in S3. Then, the main control circuit 10 checks the selected set table, and reads out a TFC power application amount corresponding to the estimated He amount. Thus, in addition to the He amount in the housing 9, by using the TFC power application amount corresponding to the pressure or temperature inside the housing 9, the flying height of the magnetic head 4 can be kept at a more appropriate level.

Figure 6:
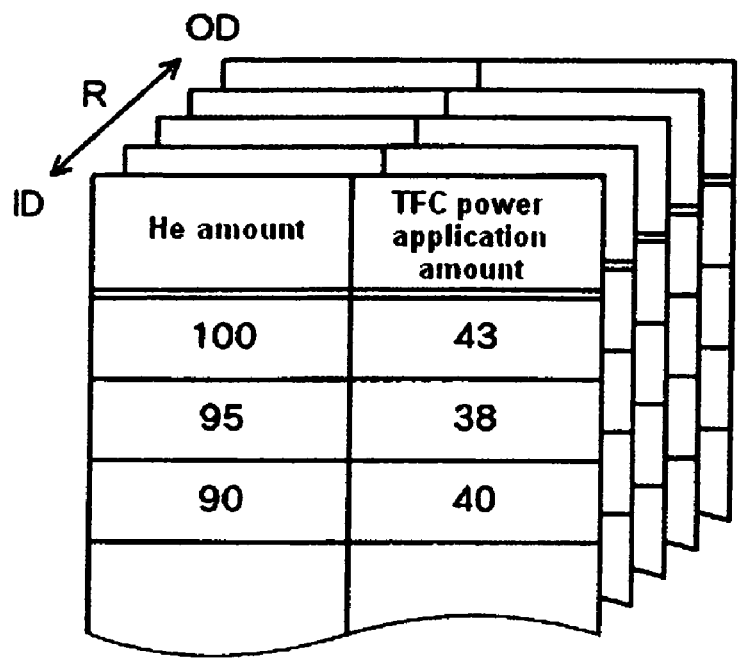
FIG. 6 shows an example of contents of a set table.

As shown in FIG. 9, when He leaks from the housing 9, a floating posture of the slider 41 of the magnetic head 4 changes. Accordingly, the flying height of the magnetic head 4 may vary according to the radial position of the magnetic disk 2. Therefore, as shown in FIG. 6, two or more set tables may be prepared corresponding to respective radial positions (R). The radial position (R) of the magnetic disk 2 where the magnetic head 4 is positioned can be obtained by servo data read from the magnetic disk 2 by the magnetic head 4. Further, two or more concentric zones are formed on the magnetic disk 2. Therefore, set tables may be prepared for respective zones.

These set tables can be prepared by measuring the relationship between the He amount in the housing 9 and the flying height of the magnetic head 4 at each radial position (R) in advance. In S4, the main control circuit 10 selects a set table corresponding to a radial position at which the magnetic head 4 is positioned, checks the selected set table, and reads a TFC power application amount corresponding to an estimated He amount. Thus, in addition to the He amount in the housing 9, by using the TFC power application amount corresponding to a radial position at which the magnetic head 4 is positioned, the flying height of the magnetic head 4 can be kept at a more appropriate level.

Hereafter, estimation of the He amount inside the housing 9 in S2 will be described First Example of He Amount Estimation In one example, the main control circuit 10, as an estimation part, estimates the He amount based on the temperature change rate (temperature change speed) of the heat generating body provided in the housing 9. To be specific, the main control circuit 10 heats the heat generating body provided in the housing 9, measures its temperature, and calculates the temperature change rate of the heat generating body.

The temperature change rate of the heat generating body is a value reflecting a heat conductive rate (namely, a capacity to absorb heat from the heat generating body, a capacity to cool the heat generating body) peculiar to gases including a low density gas such as He etc. charged into the housing 9 and air flowing into the housing 9.

In an embodiment, as a heat generating body, a voice coil motor 7 (particularly, a coil part 7*c*) is used. In this case, it is not necessary to additionally provide a heat generating body in the housing 9.

Figure 7:
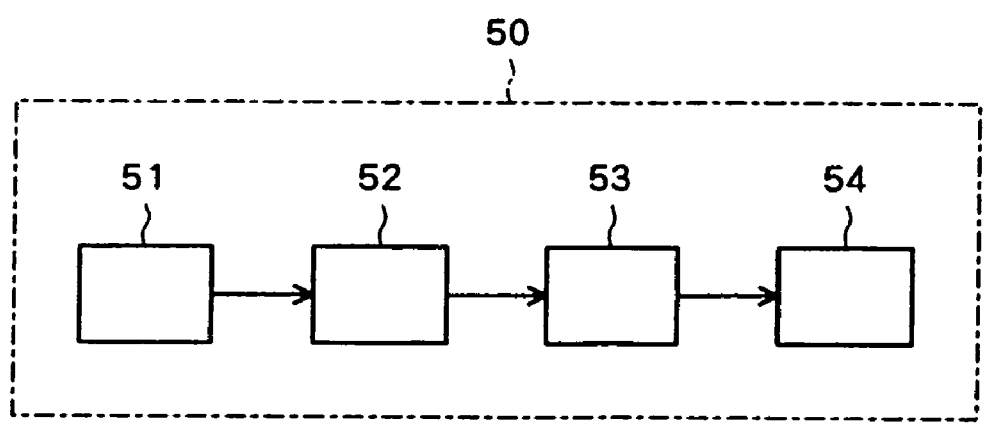
FIG. 7 is an exemplary block diagram showing a functional configuration of an estimation part realized in a main control circuit.

FIG. 7 is a block diagram showing a function of the estimation part 50 realized in the main control circuit 10. The estimation part 50 includes, in terms of functions, a heating treatment part 51, a temperature measurement part 52, a change rate calculation part 53, and a He amount estimation part 54.

The heating treatment part 51 heats the coil part 7*c* by applying electric power to the coil part 7*c* of the voice coil motor 7 provided in the housing 9. For example, while having the magnetic head 4 retreat onto the ramp part 25, the heating treatment part 51 applies electric power to the coil part 7*c* such that it drives it toward the side where the head assembly 6 is pressed to the ramp part 25. Accordingly, the coil part 7*c* can be heated without causing a flutter of the head assembly 6 supporting the magnetic head 4.

When predetermined conditions are met, such as a case where a prescribed time has passed after heating the coil part 7*c*, the heating treatment part 51 stops heating the coil part 7*c*. However, the predetermined conditions are not limited to this, and the conditions for stopping the heating may include a case where the amount of heat energy supplied to the coil part 7*c* reaches a fixed amount or a case where the temperature of the coil part 7*c* reaches a fixed temperature. These conditions can be calculated, for example, from the electric-current value supplied to the coil part 7*c*.

Further, the heating treatment part 51 informs the temperature measurement part 52 of the timing to start heating the coil part 7*c* or the timing to stop heating the coil part 7*c*.

Upon receipt of notification from the heating treatment part 51, the temperature measurement part 52 measures the temperature of the coil part 7*c* with predetermined timing. Specifically, the temperature of the coil part 7*c* is calculated by measuring an electric resistance value of the coil part 7*c*.

That is, there is a correlation between the temperature of the coil part 7*c* and the electric resistance value. Therefore, by using the data showing the correlation, the temperature measurement part 52 calculates the temperature of the voice coil motor 7 from the measured electric resistance value of the coil part 7*c*. The data showing the correlation between the temperature of the coil part 7*c* and the electric resistance value is created beforehand and stored, for example, in the memory or the main control circuit 10 or on the magnetic disk 2.

Moreover, the electric resistance value of the coil part 7*c* can be calculated from the electric current value and voltage value of the coil part 7*c*. These are obtained from the motor driver 17. The electric current may be supplied to the coil part 7*c* during the measurement when the resistance value is smaller than, for example, the electric current supplied when heating the coil part 7*c*.

Moreover, the timing to measure the temperature of the coil part 7*c* can be two or more times during heating or after heating. That is, after starting to heat the coil part 7*c*, the temperature measurement part 52 measures the temperature of the coil part 7*c* which rises with the lapse of time with a plurality of timing. Also, after having heated the coil part 7*c*, the temperature measurement part 52 measures the temperature of the coil part 7*c* which falls with the lapse of time with a plurality of timing.

Furthermore, other than the temperature of the above coil part 7*c*, the temperature measurement part 52 detects the temperature in the housing 9 by a temperature sensor 28 provided in the housing 9.

The temperature measurement part 52 outputs measurement results to a change rate calculation part 53. The measurement results include the temperature of the coil part 7c measured at each timing, the time between the timing, and the temperature in the housing 9.

Upon receipt of the measurement results from the temperature measuring part 52, based on the temperature of the coil part 7c measured at each timing, the time between the timing, and the temperature in the housing 9 included in the measurement results, the change rate calculation part 53 calculates the temperature change rate of the coil part 7c.

Specifically, by using a relational expression shown as Expression (1) below, the change rate calculation part 53 calculates a time constant τ showing the temperature change rate of the coil part 7c. In Expression (1), "$T_{VCM|t=0}$" represents a temperature of the coil part 7c with a first timing. Character "t" represents an elapsed time from the first timing to a second timing. "$T_{VCM}$" represents a temperature of the coil part 7c with the second timing. Moreover, "$T_{room}$" represents an internal temperature of the housing 9.

The volume of the gas with which the housing 9 is filled is large enough and the heat capacity is large enough. Therefore, it is considered that the temperature change of the gas in the housing caused by heat dissipation from the coil part 7c can be disregarded, and the temperature $T_{room}$ inside the housing 9 is thought to be constant.

$$T_{VCM} = (T_{VCM|t=0} - T_{ROOM})\exp\left(-\frac{t}{\tau}\right) + T_{room} \quad (1)$$

The value of the time constant τ thus computed decreases as the temperature change rate of the coil part 7c increases.

The change rate calculation part 53 outputs the time constant τ showing the temperature change rate of the coil part 7c to the He amount estimation part 54.

FIGS. 8(a) and 8(b) show examples of variation with the lapse of time of the temperature of the coil part 7c. FIG. 8(a) shows the temperature of the coil part 7c which falls with the lapse of time after having heated the coil part 7c. FIG. 8(b) shows the temperature of the coil part 7c which rises with the lapse of time after having started heating the coil part 7c. In FIGS. 8(a) and 8(b), a horizontal axis shows the elapsed time and a vertical axis shows the temperature of the coil part 7c. Also, a solid line shows a case where the housing 9 is filled with He and a dashed line shows a case where the housing 9 is filled with air.

As shown in FIG. 8(a), when the temperature of the coil part 7c falls with the lapse of time, the temperature change rate (which is a temperature falling rate here) of the coil part 7c in He is large as compared with the temperature change rate of the coil part 7c in the air. In other words, the time constant τ of the coil part 7c in He is small as compared with the time constant τ of the coil part 7c in the air.

On the other hand, as shown in FIG. 8(b), when the temperature of the coil part 7c rises with the lapse of time, the temperature change rate (which is a temperature rising rate here) of the coil part 7c in He is small as compared with the temperature change rate of the coil part 7c in the air. In other words, the time constant τ of the coil part 7c in He is large as compared with the time constant s of the coil part 7c in the air.

These are based on the factor that thermal conductivity of He is larger than thermal conductivity of air (that is, the cooling capacity of He is higher than air). For this reason, the time constant τ showing the temperature change rate of the coil part 7c serves as an index for estimating the He density inside the housing 9.

Based on the time constant τ showing the temperature change rate of the coil part 7c inputted from the change rate calculation part 53, the He amount estimation part 54 estimates He density inside the housing 9. The He density in the housing 9 estimated here is treated as He amount in the housing 9. Specifically, the He amount estimation part 54 checks an estimation table (not shown) in which the time constant τ and He density are correlated, and reads He density in the housing 9 corresponding to the time constant τ showing the temperature change rate of the coil part 7c. The estimation table is stored, for example, in the memory of the main control circuit 10 or on the magnetic disk 2.

Such an estimation table can be prepared, for example, by measuring, in advance, the temperature change rate of the coil part 7c corresponding to each He density. That is, first, the housing 9 is filled with He of a predetermined density. Then, the temperature change rate of the coil part 7c corresponding to each He density is measured by changing He density inside the housing 9 two or more times and performing the process, each time, of measuring the temperature change rate of the coil part 7c under such an environment.

Thus, the main control circuit 10, as an estimation part, can estimate the He amount inside the housing 9 based on the temperature change rate of the coil part 7c of the voice coil motor 7. Moreover, such an estimation method of He amount has a benefit such that it can be performed also in a state where the magnetic disk 2 is not rotating.

As described above, the aspect of He leaking from the housing 9 includes an aspect where only a small amount of air compared to the leaked He entering the housing 9. Therefore, in addition to the He density read from the estimation table, the main control circuit 10 may estimate the He amount in the housing 9 based on the pressure in the housing 9 detected by the pressure sensor 27. For example, the He amount inside the housing 9 may be estimated by preparing two or more estimation tables corresponding to respective pressures. In this way, the He amount inside the housing 9 can be estimated more specifically.

The He amount inside the housing 9 may be estimated by compensating for the He density inside the housing 9 read from the estimation table corresponding to the detected pressure inside the housing 9. The pressure inside the housing 9 and the He amount have a linear relationship. Therefore, the He density read from the estimation table is multiplied by a coefficient corresponding to a difference between the detected pressure inside the housing 9 and a pressure to be a reference (for example, atmospheric pressure). In addition, the temperature changes according to a change in pressure inside the housing 9. Therefore, compensation may also be made according to the temperature. Also, since the pressure inside the housing 9 and the temperature have the linear relationship, the compensation may be made according to a ratio of the pressure to the temperature.

Second Example of He Amount Estimation

In an example, the main control circuit 10 as an estimation part obtains a signal which varies according to He density inside the housing 9 and, based on the signal, estimates the He amount. The signal which varies according to the He density in the housing 9 can be selected from a number of signals generated by electronic components (the R/W channel 13, motor-driver 17, etc.) included in the magnetic disk drive 1.

As an example of the signal which varies according to He density inside the housing 9, an error signal (PES: Position Error Signal) showing a position error of the magnetic head 4 can be given. This error signal is generated by calculating a difference between the target position of the magnetic head 4 determined based on a write command or a read command from an external host drive and a current position of the magnetic head 4 specified by servo data inputted from the R/W channel 13.

The error signal contains an NRRO (Non-Repeatable Run-Out) component which is asynchronous with the rotation of the magnetic disk 2. The magnitude of the NRRO component varies according to He density in the housing 9. For this reason, it can be said that the error signal is a signal which varies according to the He density in the housing 9. To be specific, the wind disturbance in the housing 9 increases as the He density inside the housing decreases. Accordingly, vibrations of the magnetic head 4 and the magnetic disk 2 increase. As a result, the magnitude of the NRRO component of the error signal increases.

Thus, the magnitude of the NRRO component contained in the error signal serves as an index to show the He density in the housing 9. Further, the magnitude of the NRRO component contained in the error signal can be calculated by eliminating RRO (Repeatable Run-Out) components from the error signal.

As another example of a signal which varies according to He density inside the housing 9, there is a signal representing the magnitude of a drive current which the motor driver 17 outputs to the spindle motor 3. As described above, the motor driver 17 monitors the rotational speed of the spindle motor 3 so that the drive current is adjusted to achieve a specified rotational speed. Therefore, the main control circuit 10 obtains the signal showing the magnitude of the drive current from the motor driver 17.

The magnitude of the drive current outputted to the spindle motor 3 varies according to He density inside the housing 9. Therefore, it can be said that the signal showing the magnitude of the drive current is a signal which varies according to the He density inside the housing 9. To be specific, as the He density inside the housing 9 decreases, the wind disturbance inside the housing 9 increases. Accordingly, resistance of the rotation of the magnetic disk 2 increases, which increases the drive current necessary to rotate the spindle motor 3 at a specified rotational speed.

Thus, the magnitude of the drive current outputted to the spindle motor 3 serves as an index to show He density in the housing 9.

The signal which varies according to He density in the housing 9 is not limited to these examples. For example, there may be provided an acceleration sensor for detecting a vibration of the magnetic disk 2, and the magnitude of the vibration of the magnetic disk 2 obtained from the acceleration sensor may be used as an index to show the He density in the housing 9.

Based on the signal thus obtained, the main control circuit 10 as an estimation part estimates He density in the housing 9. The He density in the housing 9 estimated here can be treated as He amount in the housing 9. Specifically, the main control circuit 10 checks an estimation table (not shown) in which a magnitude of an NRRO component in an error signal (which may be a magnitude of a drive current of the spindle motor 3 etc.) and He density are correlated, and reads the He density in the housing 9 corresponding to the magnitude of the NRRO component. This estimation table is stored, for example, in a memory of the main control circuit 10 or on the magnetic disk 2.

Such an estimation table can be prepared, for example, by measuring the magnitude of the NRRO component corresponding to each He density. That is, first, the housing 9 is filled with He having a predetermined density. Then, a process of measuring the magnitude of the NRRO component under such an environment is repeated several times while the He density in the housing 9 is changed each time to measure the magnitude of the NRRO component corresponding to each He density.

As described above, based on the magnitude of the NRRO component included in the error signal, the magnitude of the drive current of the spindle motor 3, etc., the main control circuit 10 can estimate the He amount in the housing 9.

As in the first example, in addition to the He density read from the estimation table, based on an internal pressure of the housing 9 detected by the pressure sensor 27, the main control circuit 10 may estimate the He amount in the housing 9. In this way, the He amount inside the housing 9 can be estimated more specifically.

Other Examples of He Amount Estimation

The estimation method of the He amount is not limited to the examples described above. For example, in an aspect of He leaking from the housing 9 where the air does not flows in even when the He begins to leak and the He leaks from the housing 9 one-sidedly, the He amount in the housing 9 may be estimated based on the pressure inside the housing 9 detected by the pressure sensor 27. To be specific, when the He leaks from the housing 9 one-sidedly, since the pressure inside the housing 9 and the amount of He have the linear relationship, it is possible to estimate the He amount in the housing 9 from the pressure inside the housing 9.

Even in an aspect of such a He leak, air may flow into the housing 9. Therefore, in addition to the pressure inside the housing 9 detected by the pressure sensor 27, the main control circuit 10 may estimate the He amount in the housing 9 based on the He density estimated by the above method. In this way, the He amount in the housing 9 can be estimated more specifically.

In addition, for example, a He sensor for detecting the He density may be provided in the housing 9, and the main control circuit 10 may estimate the He amount in the housing 9 according to the He density obtained from the He sensor. Alternatively, an oxygen sensor for detecting oxygen density may be provided in the housing 9, and the main control circuit 10 may calculates the He density in the housing 9 backward from the oxygen density obtained from the oxygen sensor to estimate the He amount in the housing 9.

What is claimed is:

1. A magnetic disk drive including a magnetic head, a magnetic disk, and a housing containing the magnetic head and the magnetic disk, wherein the housing is filled with a low density gas having a lower density than air, the magnetic disk drive comprising:
    a heat generating body provided in said housing;
    an estimation part for estimating an amount of said low density gas in said housing based on a temperature change rate of said heat generating body; and
    a control part for controlling a flying height of said magnetic head from a surface of said magnetic disk based on the amount of said low density gas.

2. A magnetic disk drive according to claim 1 further comprising, as said heat generating body, a voice coil motor which moves said magnetic head relative to said magnetic disk.

3. A magnetic disk drive according to claim 1, wherein the estimation part measures temperatures of said heat generating body during heating or after heating with a plurality of timings to calculate the temperature change rate of said heat generating body.

4. A magnetic disk drive according to claim 1 further comprising a pressure sensor for detecting an internal pressure of said housing, wherein said estimation part estimates the amount of said low density gas based on a density of said low density gas and the pressure in said housing.

5. A magnetic disk drive according to claim 1, wherein said estimation part obtains a signal which varies according to a density of said low density gas in said housing and estimates the density of said low density gas based on the signal.

6. A magnetic disk drive according to claim 5, wherein:
said signal is a signal in which the magnitude of an NRRO component varies according to a density of said low density gas in said housing; and
said estimation part estimates the density of said low density gas based on the magnitude of said NRRO component.

7. A magnetic disk drive according to claim 5 further comprising a spindle motor for rotating said magnetic disk, wherein:
said signal is a signal showing a magnitude of output to said spindle motor; and
said estimation part estimate the density of said low density gas based on the magnitude of the output to said spindle motor.

8. A magnetic disk drive according to claim 5 further comprising a pressure sensor for detecting an internal pressure of said housing,
wherein said estimation part estimates the amount of said low density gas based on the density of said low density gas and the pressure in said housing.

9. A magnetic disk drive according to claim 1 further comprising a pressure sensor for detecting an internal pressure of said housing,
wherein said estimation part estimates the amount of said low density gas based on the pressure in said housing.

10. A magnetic disk drive according to claim 9,
wherein said estimation part estimates a density of said low density gas in said housing and, based on the density of the low density gas and the pressure in said housing, estimates the amount of said low density gas.

11. A magnetic disk drive according to claim 1, wherein said control part increases a flying height of said magnetic head in response to a decrease in the amount of said low density gas.

12. A magnetic disk drive according to claim 1, wherein said control part controls a flying height of said magnetic head based on a positive change rate and a negative change rate.

13. A magnetic disk drive according to claim 1 further comprising a pressure sensor for detecting an internal pressure of said housing,
wherein said control part controls the flying height of said magnetic head based on the amount of said low density gas and the pressure in said housing.

14. A magnetic disk drive according to claim 1 further comprising a temperature sensor for detecting an internal temperature of said housing,
wherein said control part controls the flying height of said magnetic head based on the amount of said low density gas and the temperature in said housing.

15. A magnetic disk drive according to claim 1, wherein said control part obtains positional information representing a radial position of said magnetic disk where said magnetic head is positioned and, based on the amount of said low density gas and said positional information, controls the flying height of said magnetic head.

16. A magnetic disk drive according to claim 1,
wherein said magnetic head comprises an electric heating body which generates heat when electric power is applied; and
wherein said control part controls the flying height of said magnetic head by controlling the amount of power applied to said electric heating body.

17. A magnetic disk drive according to claim 1, wherein said low density gas is helium.

* * * * *